United States Patent [19]

Emerson et al.

[11] 3,839,306

[45] Oct. 1, 1974

[54] CATALYTIC PROCESS FOR PREPARING TRIAZINES AND NITRILE POLYMERS

[75] Inventors: William E. Emerson; Edwin Dorfman, both of Grand Island, N.Y.

[73] Assignee: Hooker Chemical Corporation, Niagara Falls, N.Y.

[22] Filed: Dec. 29, 1972

[21] Appl. No.: 319,119

Related U.S. Application Data

[63] Continuation of Ser. No. 634,892, May 1, 1967, abandoned, which is a continuation-in-part of Ser. No. 594,997, Nov. 17, 1966, abandoned.

[52] U.S. Cl. ............. 260/87.7, 260/37 N, 260/2 M
[51] Int. Cl. ............................................. C08g 33/02
[58] Field of Search..... 260/37 N, 248 C, 2 M, 87.7

[56] References Cited
UNITED STATES PATENTS
3,453,275  1/1969  Grindahl ............................ 260/248

*Primary Examiner*—Allan Lieberman
*Assistant Examiner*—Richard Zaitlen
*Attorney, Agent, or Firm*—Peter F. Casella; James F. Mudd

[57] ABSTRACT

This invention (A) relates to a process for preparing triazines, nitrile polymers, and cross-linked polymers or copolymers by (1) condensing a nitrile in the presence of or (2) contacting a polymer or copolymer with a metal catalyst selected from the Periodic Table Groups IB, IIA, IIB, IIIA, IVA, VA, and VIII, preferably metals such as copper, zinc, barium, cadmium, thallium, indium, tin, lead, and bismuth, the nitrile typically being perfluorobutyronitrile, difluoroacetonitrile, difluorochloroacetonitrile, perfluoroglutaronitrile, perfluorosuccinonitrile, benzonitrile, trifluoroacetonitrile, pentafluoropropionitrile, perfluoromalononitrile, bromotetrafluoropropionitrile, trichloroacetonitrile, bromooctafluorovaleronitrile, perfluorooctanonitrile, bromohexafluorobutyronitrile, and the like; and (B) relates to the nitrile polymers and cross-linked polymers or copolymers produced by the above process and/or such compounds containing the above-identified catalysts.

7 Claims, No Drawings

CATALYTIC PROCESS FOR PREPARING TRIAZINES AND NITRILE POLYMERS

This is a continuation, of application Ser. No. 634,892, filed May 1, 1967, now abandoned, which is a continuation in part of Ser. No. 594,997 filed Nov. 17, 1966, now abandoned.

This invention relates to the trimerization and the curing of cyano-group-containing polymers by the employment of a critical metal in elemental form, as a catalyst. The invention also relates to the products formed thereby.

BACKGROUND OF THE INVENTION

Prior to the filing of this application, triazines have been produced from nitriles by the employment of a catalytic amount of a catalytic composition. For example, U.S.P. 3,095,414 employs a combination of ingredients which jointly have a catalytic effect sufficiently to convert a nitrile into a triazine.

An object of this invention is a novel process of cross-linking particular polymers or copolymers, by the employment of a critical catalyst.

Another object of this invention is a novel composition of polymers or copolymers, including a critical catalyst.

Another object is a process of producing triazine and/or nitrile polymers by the employment of a critical catalyst.

Other objects of this invention become apparent from the above and following disclosure.

THE DESCRIPTION

The present invention relates to a novel process for preparing a compound selected from the group consisting of a triazine composition, a nitrile polymer composition, and a cross-linked polymer or copolymer composition, comprising (1) condensing in the intimate presence of or (2) contacting with a metal selected from the group consisting of the Periodic Table Groups Ib, IIA, IIB, IIIA, IVA, VA, and VIII, a member selected from the group consisting of (a) a nitrile and mixtures thereof and (b) a first polymer or copolymer which contains an average of at least more than one nitrile group per molecule of said first polymer or copolymer, and mixtures of said first polymer or copolymer, said contacting being at a temperature and for a time-period sufficient to produce, respectively, a composition comprising (1) a triazine composition, (2) a nitrile polymer composition, or (3) a cross-linked polymer or copolymer composition containing said metal, and relates to novel triazines, nitrile polymers, polymer or copolymer compositions and cross-linked forms of the polymer or copolymer compositions. This invention also includes polymers or copolymers produced by processes other than the processes disclosed herein, provided that the final composition has a catalyst of this invention dispersed therein.

The preceding paragraph refers to the necessity of an average of at least more than one nitrile group per molecule. Thereby, this invention requires (1) that at least one polymer or copolymer molecule contain two nitrile groups and (2) that each molecule contain at least one nitrile group. Any polymer or copolymer molecule that does not contain at least one nitrile group is not a part of those molecules upon which the average of greater than one per molecule is based; a polymer or copolymer not containing a nitrile group would constitute merely a filler material. In a like manner, the language "at least greater than an average of one cyanofluoroalkyl group per molecule" has the same meaning. Also it should be noted that the degree of cross-linking increases with a corresponding increase in the number of nitrile groups per molecule. The optimum number of nitrile group per molecule will therefore depend upon the properties desired for a particular use. Also, the optimum number of nitrile group on the molecule depends upon the molecular weight of the polymer or copolymer employed. It should be noted that it is within the scope of this invention to employ polymers or copolymers such as triazine polymers which may be degraded by some means such as by milling, for example, to produce fragments, some of which contain the nitrile groups.

The polymers or copolymers of this invention, and cross-linked forms thereof, i.e., those which contain the catalyst of this invention, are each characterized by novel properties and uses which are distinct from the properties of conventional cross-linked polymers produced by other processes which do not contain the catalyst of this invention. However, in addition to new uses based on the novel properties, the compositions of this invention may be employed for conventional uses of conventional triazines and cross-linked polymers.

Preferred polymers or copolymers include at least greater than an average of one cyano per fluoroalkyl group per molecule in which the alkylene is methylene, ethylene, propylene, butylene, pentylene, hexylene, heptylene, octylene, nonylene, decylene, and the like. However, higher alkylene groups may be employed.

More particularly, the present invention relates to a novel process for preparing triazines and nitrile polymers by condensing a nitrile in the presence of a metal selected from the group consisting of the Periodic Table Groups IB, IIA, IIB, IIIA, IVA, VA, and VIII, preferably from the group consisting of copper, iron, indium, bismuth, lead, tin, thallium, zinc, barium, beryllium, and cadmium. Experimental evidence suggests that non-preferred catalysts require temperatures higher than about 190°C for more than about twenty hours to bring about trimerization; such metals include silver, boron, aluminum, gallium, silver, arsenic, antimony, rubidium, platinum, palladium and the like.

The nitrile is of the formula:

$$PQCN$$

wherein Q is selected from the group consisting of $$-\!\!\left[(CXY_m(Z)_a(CGL)_n(W)_b\right]\!\!-d$$

wherein:

a. X and G are selected from the group consisting of chlorine, fluorine, bromine, and iodine;

b. Y and L are selected from the group consisting of hydrogen, fluorine, chlorine, bromine, iodine, alkyl of one to 20 carbon atoms, haloalkyl of one to 25 carbon atoms, aryl of six to 20 carbon atoms, perhaloalkyl, perhaloalkenyl of one to 25 carbon atoms, nitrile, and cyanoperhaloalkyl;

c. $m$ and $n$ are integers, the sum of which must be at least one;

d. Z and W are selected from the group consisting of —CXY—; —CGL—, perhalo lower alkylidene of one to 12 carbon atoms, perhalo lower alkylene of 1 to 12 carbon atoms, carbonyl, oxy, sulfinyl, thio, thiocarbonyl, diazo, tetrafluorothio, sulfonyl, alkylene radicals of the formula

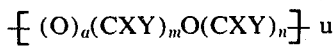

wherein $a$ ranges from 0 to 1, $u$ ranges from 1 to 10, and $m$ and $n$ are as hereinbefore defined, and N-substituted azaalkylene radicals of the formula:

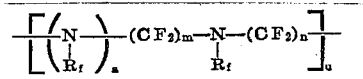

wherein $R_f$ is selected from the group consisting of fluorine and perfluoroalkyl groups of one to 12 carbon atoms, and $a$, $u$ (each occurance), $m$, and $n$ are as herein defined;

e. $a$ (each occurance), $b$, and $d$ range from 0 to 1;

f. P is selected from the group consisting of hydrogen, fluorine, chlorine, bromine, iodine, and nitrile; and g. E, I; J, and K are selected from the group consisting of hydrogen, fluorine, chlorine, bromine, iodine, alkyl of one to 20 carbon atoms, aryl of six to 20 carbon atoms, aryloxy of six to 20 carbon atoms, alkoxy of one to 20 carbon atoms, arylcarbonyl of six to 20 carbon atoms and nitrile.

The products formed by said process are of the formula $(PQCN)_y$ wherein $y$ is from two to 20. If a mononitrile is the starting material, said nitrile will generally all be converted to a triazine when used in the process of this invention.

When an aromatic nitrile is used, and copper is the catalyst it is preferred that no halogen(s) selected from the group consisting of chlorine, bromine, and iodine be substituted on the ring.

When a di- or polynitrile is the starting material, said nitrile, when used in the process of this invention, is converted into nitrile condensation products, such as dimers, trimers, tetramers, and similar low, medium, and high molecular weight insoluble polymers.

A mixture of nitriles may be used to obtain a mixture of triazines. For example, if a mixture of trifluoroacetonitrile and perfluorooctanonitrile is condensed, three different novel triazine products are obtained as shown below.

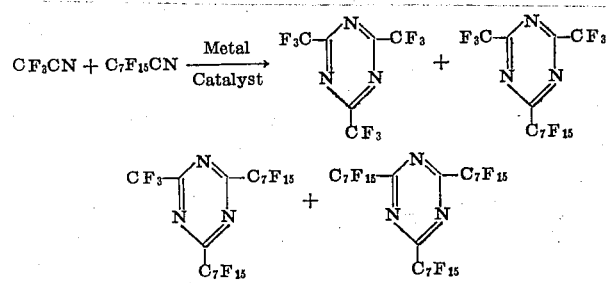

Similarly, if a mixture of dinitriles is condensed, polymers with varying substituents are obtained.

Fluorine is an especially preferred halogen for the X, Y, and Z groups defined above, but the chloro, bromo, and iodo analogs also give good results. When Y or L is perfluoroalkenyl it will preferably contain from one to 10 carbon atoms. When Y or L is aromatic it will preferably be phenyl.

Nitriles especially preferred for use in the process of this invention include those of the formula:

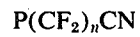

wherein P is as hereinbefore defined and wherein when P is fluorine or chlorine $n$ ranges from 1 to 12, those of the formula

wherein D is selected from the group consisting of oxygen and tetrafluorosulfur groups, and wherein n and m range from one to 12, and P is as hereinbefore defined; and those of the formula

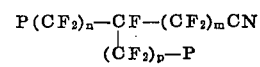

wherein $p$, $n$ and $m$ range from one to 12, and wherein P is as hereinbefore defined. Some of the especially preferred nitriles represented by said formulae include perfluorobutyronitrile, difluoroacetonitrile, difluorochloroacetonitrile, perfluoroglutaronitrile, perfluorosuccinonitrile, trifluoroacetonitrile, pentafluoropropionitrile, perfluoromalononitrile, bromotetrafluoropropionitrile, bromooctafluorovaleronitrile, nonafluoro-3-thiabutyronitrile, perfluoroethyladiponitrile, perfluorosuberonitrile, perfluorosebaconitrile, perfluorovaleronitrile, 4-bromohexafluorobutyronitrile, perfluoroadiponitrile, perfluorotetradecane dinitrile, perfluoromethoxypropionitrile, perfluorooctanonitrile, and perfluoroethoxypropionitrile.

Other nitriles which are operative in the process of this invention include, e.g., perfluorocapronitrile; 3,4-dibromopentafluorobutyronitrile; fluorobenzonitrile; difluorobenzonitrile; polyfluorobenzonitrile; perfluorobenzonitrile; perfluorododecane nitrile; perfluorotetradecane nitrile; perfluorostearonitrile; trifluoromethylbenzontirile; benzonitrile; 2-nitro-4-trifluoromethylbenzonitrile; perfluorooleonitrile; m-(trifluoromethylbenzoyl)benzonitrile; 2-phenyl-2,4,4,4-tetrafluoroacetonitrile; 4-iodohexafluorobutyronitrile; ω-iodo-perfluorotetradecane nitrile; ω-bromoperfluoroheptadecane nitrile; ω-chloroperfluorotridecane nitrile; ω-iodioperfluoroeicosane nitrile; ω-bromoperfluorodocosane nitrile; ω-chloroperfluorotricosane nitrile; 3-hydrotetrafluoropropionitrile; ω-hydroperfluorononane nitrile; ω-hydroperfluorononadecane nitrile; 3-hydrohexafluorobutyronitrile; 3-phenyltetrafluoropropionitrile; 3-phenyl-4-hydro-4-chlorotetrafluorobutyronitrile; 4-phenyl-3-iodopentafluorobutyronitrile; trifluoroacrylonitrile; perfluoro-4-decene nitrile; perfluoro-10-eicosene nitrile; terephthalonitrile; 1,4-dicyanonaphthalene, 4-chlorobenzonitrile; 4-nonylbenzonitrile; 3-ketotetrafluoroglutaronitrile; 4-trifluoroacetylbenzonitrile; 4-trifluorothioacetylbenzonitrile; 9-ketoperfluorodecane nitrile; 9-thioketoperfluoronandecane nitrile; 14-ketoperfluorononadecane nitrile; 14-thioketoperfluorononadecane nitrile; 1,6-bis[4-cyanophenyl]- 1,6-di-[tetrafluorothia] hexane; perfluoro-N,N'-dimethyl-3,6-diazaoctane dinitrile; perfluoro-N,N'-diethyl-3,6-diazatridecane nitrile; perfluoro-N,N'-diethyl-6,15-diazaoctadecane nitrile; 3- [N - phenyl-N-trifluoromethyl amino ] tetrafluoropropionitrile; 4-bromobenzonitrile; 3-iodo-5-methylbenzonitrile; 4- cyanobiphenyl; 4,4'-dicyanodiphenyl ether;4-[undecafluoro-1-thiabutyl] benzonitrile; 4,5-diazaoctrafluoro-4-octene dinitrile; 4,5-diazaperfluoro-4-tridecene nitrile; 7,8-diaza-20-hydroperfluoro-7-eicosene nitrile; 4,4'-dicyanoazobenzene; 4-cyano-3'-methyl-4'chloroazobenzene; perfluoromethyl-2-cyanoperfluoroethyl sulfoxide; perfluoromethyl-2-cyanoperfluoroethyl sulfone; perfluoroheptyl-4-cyanoperfluorobutyl sulfoxide; perfluoroheptyl-4-cyanoperfluorobutyl sulfone; methyl-4-cyanophenyl sulfoxide; methyl-4-cyanophenyl sulfone; 8-thia, 8-keto, 20-hydroperfluoroeicosane nitrile; perfluoro-4-8-dithiaundecane dinitrile; perfluoro-4,8-di[tetrafluorothia] undecane dinitrile; perfluoro-2-methyl-4-thiaheptane nitrile; perfluoro-2-methyl-4[tetrafluorothia]heptane; heptafluoropropyl-4-cyanophenyl sulfide; 1,4[4,4'-dicyanodithiophenoxy]-butane; 20-hydroperfluoro-8-thiaeicosane nitrile; 20-hydroperfluoro-8-tetrafluorothiaeicosane nitrile; 4-chloro-3-perfluorobutyrylbenzonitrile; 4-chloro-3-perfluorothiobutyrylbenzonitrile; 4-benzoylbenzonitrile; 4-thiobenzoylbenzonitrile; perfluoro-2,12-dimethyl-4,10-dioxatridecane dinitrile; perfluoro-4-oxadodecane nitrile; 4-trifluoromethoxybenzonitrile; 4,4'-dicyanodiphenoxyethane; 4,4'-dicyanodiphenyl sulfoxide; 4,4'-dicyanodiphenyl sulfone; perfluorobenzonitrile; nitriles of the formula

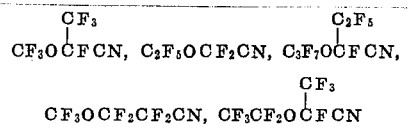

wherein m is one or more, wherein R'$_f$ is lower perfluoroalkyl and R$_f$ is selected from the group consisting of fluorine, and perfluoroalkyl of from one to 12 carbon atoms, such as

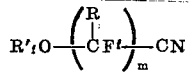
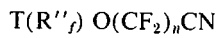

and the like; nitriles of the formula $$T(R''_f) O(CF_2)_nCN$$

wherein T is selected from the group consisting of hydrogen and halogen, R''$_f$ is perfluoroalkylene of one to 12 carbon atoms, and n is from one to 10, such as

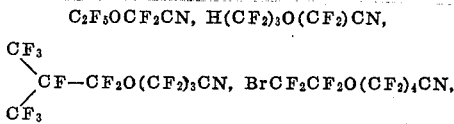

perfluoroisobutyloxypropionitrile, perfluorohexyloxypropionitrile, perfluorooctyloxypropionitrile, and the like; and mixtures of the aforementioned nitriles.

The catalysts which have been found operative and which are employed in the process of this invention preferably are selected from the group consisting of bismuth, copper, iron, indium, lead, tin, thallium, zinc, barium, beryllium, and cadmium. Within this group, it is perferred to use catalysts selected from the group consisting of bismuth, copper, lead, tin, thallium, cadmium and barium, and it is even more preferred to use catalysts selected from the group consisting of copper, cadmium, lead and barium. The catalysts may be used in any catalytic amount from 0.01 to 10 percent by weight of the nitrile to be condensed. Preferably, the catalyst will be employed in an amount between 0.05 to 6 percent by weight of the nitrile to be condensed. The above catalysts may be used alone, or in combination in the process of this invention.

The nitrile condensation reaction may be run in any solvent which does not react with the nitrile, the catalyst, or the reaction products of the nitrile and catalyst. Suitable solvents include, e.g., n-butyl acetate, carbontetrachloride, ortho-fluorotoluene, fluorobenzene, nitrobenzene, cyclohexanone, ortho-difluorobenzene, diethylcarbitol, dimethylsulfoxide, dioxane, ethyl acetate, and the like. This list is merely illustrative, and does not purport to describe the vast number of solvents which can be used in the process of this invention.

The process of this invention for producing the triazines, nitrile polymers and cross-linked polymers or copolymers is operable at a temperature of from 0° to 400° centigrade, though it is preferred to work in the 25° to 250° centigrade range, and an even more preferred temperature range is that of from about 25° to about 190° centigrade. The process of this invention is operable at atmospheric or autogenous pressures.

The reaction time is dependent on the catalyst employed, the amount of catalyst employed, the temperature at which the reaction is carried out, and the degree of conversion desired. Reaction times of from about 4 hours to about 7 days are satisfactory.

The triazines, nitrile polymers, and cross-linked polymers or copolymers produced by the above process of this invention are useful in applications (uses) requiring high temperature stability. The novel triazines of this invention are useful both as high temperature lubricants and solvents, and the nitrile polymers produced by the above process when a dinitrile is condensed, and which contain the critical catalyst of this invention, are useful in the preparing of cross-linked highly heat-resistant molded articles.

A novel mixture of this invention useful in preparing a cross-linked polymer or copolymer composition, and useful for employment as a high temperature sealant includes a polymer or copolymer in combination with the metal catalyst of this invention. In a second novel mixture, the above polymer or copolymer is a cross-linked structure.

The novel process of this invention includes the steps of curing, i.e. cross-linking a polymer or copolymer described above containing a sufficient number of nitrile groups, the curing being (1) at a sufficiently elevated temperature and for a period sufficiently long and (2) in the intimate presence of the above described critical catalyst of this invention, to cross-link (vulcanize) to form a cross-linked polymer or a cross-linked copolymer.

The cross-linking process of this invention may (for example) employ any polymeric composition having at least greater than an average of one cyanohaloalkyl group per molecule in the novel presence of a catalytic amount of the catalyst of this invention to crosslink to form a cross-linked polymer or copolymer. The cross-linked former cyano-group-containing polymers and copolymers of the novel curing process exhibit novel properties. The particular properties depend, for example, upon which particular catalyst of this invention is employed, the filler employed, the polymer or copolymer molecular weight, the number of nitrile groups on the molecule and the like.

The degree of cross-linking for polymers and copolymers of this invention has been found to typically depend on the number of cyanohaloalkyl groups along the polymer chain, the amount of catalyst used, and on the time and the temperature range which is used in the curing process of the polymer. The polymers which have been cross-linked by this method have been perfluoroalkylenetriazine polymers of a wide range of molecular weight. The particular curing temperature necessary typically depends upon which catalyst is employed, the amount of catalyst employed, the particular polymer or copolymer, and the duration of curing. Normally the curing temperature is at least about 25°C, up to about 200°C, for example, preferably up to about 150°C.

Lower molecular weight perfluoroalkylenetriazine polymers which have nitrile groups only at the polymer chain ends have been cured catalytically. Perfluoroalkylenetriazine polymers which have cyanoperfluoroalkyl groups at the 6 position of the triazine ring have also been successfully cured. The percentage of cyanoperfluoroalkyl groups at the 6 position of the triazine ring on these polymer molecules may vary from less than 1 percent up to 100 percent. A preferred percentage is from about 3 percent to 20 percent of nitrile-containing groups in the 6 position of the triazine ring. Perfluoroalkylenetriazine polymers have been described in our copending application U.S. Ser. No. 553,430, which disclosure is hereby incorporated by reference.

Other fluorine-containing polymers such as the tetrafluoroethylene-trifluoronitrosomethane copolymers might also be cured by these catalytic curing processes. Perfluoroalkylene ether polymers, perfluoropropylene-vinylidene fluoride copolymers, fluoroalkyl silicone polymers and the like also may be cured by the catalyst.

The following Examples are not intended to limit the invention disclosed herein except to the extent that limitations are specifically stated or to the extent to which limitations appear in the appended claims. The invention is illustrated by the following non-limiting examples in which temperatures are expressed in degrees centigrade, and parts are by weight, unless otherwise indicated.

EXAMPLES 1 – 10

In the following examples illustrated in Table I, 3.56 parts of perfluorooctanonitrile were reacted with the specified catalyst for 20 hours at a temperature of 190 degrees centigraded. The yield of tris(perfluoroheptyl) triazine was calculated as a function of the percent of nitrile reacted.

TABLE I

| Example | Catalyst | Parts of Catalyst | Per Cent Nitrile Reacted | Per Cent Yield of Triazine |
| --- | --- | --- | --- | --- |
| 1 | Bismuth | 0.094 | 11 | 100 |
| 2 | Copper | 0.029 | 64 | 100 |
| 3 | Iron | 0.025 | 1 | 100 |
| 4 | Indium | 0.052 | 1 | 100 |
| 5 | Lead | 0.093 | 59 | 100 |
| 6 | Tin | 0.053 | 15 | 100 |
| 7 | Thallium | 0.092 | 15 | 100 |
| 8 | Zinc | 0.029 | 2 | 100 |
| 9 | Barium | 0.062 | 100 | 100 |
| 10 | Cadmium | 0.101 | 100 | 100 |

The products of Examples 1 to 10 are useful as high temperature oils and solvents.

EXAMPLE 11

Ten parts of a compound of the structure $NC(CF_2)_8CN$ are reacted with 0.07 parts of copper for 20 hours at a temperature of 190° centigrade. A polymer containing cross-linked triazine systems is obtained. The product of this example is useful in preparing molded objects having high thermal stability which are useful as fittings, couplings, and gaskets.

EXAMPLE 12

To a glass autoclave containing one part of copper is charged 130 parts of perfluorobutyronitrile. The vessel is sealed under nitrogen and heated at 170° centigrade at autonomous pressure. After 35 hours, the pressure had leveled off. The autoclave is then cooled, the pressure is reduced to zero pounds per square inch gauge, and thereafter the autoclave is opened and the contents thereof filtered. The product is distilled at about 42°–45 degrees centigrade at a pressure of one millimeter of mercury, yielding tris(perfluoropropyl) triazine. When cadmium is used instead of copper, similar results are obtained.

EXAMPLE 13

One part barium and 100 parts of perfluorooctanonitrile are heated at 160° centigrade for a period of four days. Tris (perfluoroheptyl) triazine, with a boiling point of 130° centigrade of 0.025 millimeters of mercury, is recovered by distillation.

EXAMPLE 14

Example 13 is repeated, except that five parts of cadmium are used. The reaction is complete in 8 hours, and the same product is recovered.

EXAMPLE 15

In the following experiment as set forth in Table II below, a perfluoroalkylenetriazine polymer containing from one to twenty cyanoperfluoropropyl groups for every 99 to 80 perfluoropropyl groups respectively in the polymer chain was mixed with about 5 percent by weight of catalyst (1 g. polymer per 0.05 g. catalyst). The mixtures were then heated for the periods of time indicated, then tested for solubility in hexafluoroxylene which dissolves uncrosslinked perfluoroalkylenetriazine polymers but not the crosslinked polymers.

Vulcanization (i.e., curing or crosslinking) usually occurs at temperatures ranging from about 25° to about 150° Centigrade. Postcuring often increases the tensile strength of the vulcanized polymer. For barium oxide and zinc oxide, Table II discloses the process conditions and evidence of a cross-linked polymer.

TABLE II

| Catalyst | Temp. (°C) | Time (hrs.) | Solubility |
| --- | --- | --- | --- |
| Cadmium | 150°C | 97 | Insoluble |

EXAMPLE 16

The general procedure of Example 15 was followed to crosslink (vulcanize) ω-cyanohexafluoropropyl-pendant triazine polymer in three separate experiments (1, 2, and 3) separately employing copper, tin, and lead, respectively. The properties of the resulting cross-linked products are illustrated in Table III.

TABLE III

| Catalyst | Wt. % | Temp of Cure (°C) | Time of Cure (hrs.) | Tensile Strength (P.S.I.) | Elongation % | Hardness Shore "A" |
|---|---|---|---|---|---|---|
| Copper | 10 | 160 | 6 | 222 | 380 | 52 |
| Tin | 13 | 160 | 16 | 180 | 195 | 56 |
| Lead (1) | 9 | 160 | 19 | 490 | 185 | 73 |

(1) The lead-cured sample contained 23% graphite filler.

EXAMPLES 17-20

The general procedure of Examples 1-11 gave the results illustrated in Table IV.

TABLE IV

| Example | Nitrile (Parts) | Catalyst | Parts of Catalyst | Approximate Percent Nitrile Reacted | Approximate Percent Yield of Triazine |
|---|---|---|---|---|---|
| 17 | 4-Bromohexafluorobutyronitrile (3.8) | Cd | 0.083 | Moderate | low |
| 18 | 4-Bromohexafluorobutyronitrile (3.8) | Sn | 0.088 | 90% | 80% |
| 19 | Trichloroacetonitrile (2.88) | Cd | 0.11 | 18% | 90% |
| 20 | Trichloroacetonitrile (2.88) | Sn | 0.12 | Moderate | Moderate |

Various changes and modifications may be made in the method of this invention, certain preferred forms of which have been described and equivalences may be substituted without departing from the spirit and scope of this invention.

What is claimed is:

1. A process for preparing a cross-linked polymer or copolymer composition which comprises reacting at least one perfluoroalkylene triazine polymer or copolymer which contains at least one polymer or copolymer molecule containing two nitrile groups and wherein each molecule contains at least one nitrile group, in the presence of a catalytic amount of a metal selected from cadmium and metals of Groups 1B, IIA, IIIA, IVA, VA and VIII of the Periodic Table, at a reaction temperature from 0° to 400° centigrade.

2. The process of claim 1 wherein the catalyst is selected from the group consisting of copper, barium, cadmium, thallium, indium, tin, lead, beryllium, iron, bismuth and mixtures thereof, wherein the reaction temperature is from about 25° to about 190° centigrade and wherein each nitrile group is part of a cyanohaloalkyl group.

3. The process according to claim 2 wherein the alkylene groups of the cyanohaloalkyl groups are each selected from the group consisting of methylene, ethylene, propylene, butylene, pentylene, hexylene, heptylene, octylene, nonylene and decylene.

4. The process according to claim 3 wherein the catalyst is copper.

5. The process according to claim 3 wherein the catalyst is cadmium.

6. The process according to claim 3 wherein the catalyst is lead.

7. The process according to claim 3 wherein the catalyst is tin.

* * * * *